(12) United States Patent
Liu et al.

(10) Patent No.: US 10,373,610 B2
(45) Date of Patent: Aug. 6, 2019

(54) SYSTEMS AND METHODS FOR AUTOMATIC UNIT SELECTION AND TARGET DECOMPOSITION FOR SEQUENCE LABELLING

(71) Applicant: Baidu USA, LLC, Sunnyvale, CA (US)

(72) Inventors: Hairong Liu, San Jose, CA (US); Zhenyao Zhu, Sunnyvale, CA (US); Sanjeev Satheesh, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 29 days.

(21) Appl. No.: 15/698,593

(22) Filed: Sep. 7, 2017

(65) Prior Publication Data

US 2018/0247639 A1 Aug. 30, 2018

Related U.S. Application Data

(60) Provisional application No. 62/463,503, filed on Feb. 24, 2017.

(51) Int. Cl.
*G10L 15/02* (2006.01)
*G10L 15/06* (2013.01)
(Continued)

(52) U.S. Cl.
CPC ............ *G10L 15/063* (2013.01); *G10L 15/04* (2013.01); *G10L 15/16* (2013.01); *G10L 15/187* (2013.01);
(Continued)

(58) Field of Classification Search
None
See application file for complete search history.

(56) References Cited

U.S. PATENT DOCUMENTS 6,292,772 B1 * 9/2001 Kantrowitz ........... G06F 17/275
382/230
2006/0031069 A1 * 2/2006 Huang ................... G10L 13/08
704/243
(Continued)

OTHER PUBLICATIONS

Laurent, César, et al. "Batch normalized recurrent neural networks." 2016 IEEE International Conference on Acoustics, Speech and Signal Processing (ICASSP). IEEE, 2016 (Year: 2016).*
(Continued)

*Primary Examiner* — Seong-Ah A Shin
(74) *Attorney, Agent, or Firm* — North Weber & Baugh LLP

(57) ABSTRACT

Described herein are systems and methods for automatic unit selection and target decomposition for sequence labelling. Embodiments include a new loss function called Gram-Connectionist Temporal Classification (CTC) loss that extend the popular CTC loss function criterion to alleviate prior limitations. While preserving the advantages of CTC, Gram-CTC automatically learns the best set of basic units (grams), as well as the most suitable decomposition of target sequences. Unlike CTC, embodiments of Gram-CTC allow a model to output variable number of characters at each time step, which enables the model to capture longer term dependency and improves the computational efficiency. It is also demonstrated that embodiments of Gram-CTC improve CTC in terms of both performance and efficiency on the large vocabulary speech recognition task at multiple scales of data, and that systems that employ an embodiment of Gram-CTC can outperform the state-of-the-art on a standard speech benchmark.

20 Claims, 9 Drawing Sheets

(51) Int. Cl.
*G10L 15/16* (2006.01)
*G10L 15/197* (2013.01)
*G10L 15/04* (2013.01)
*G10L 15/26* (2006.01)
*G10L 15/187* (2013.01)

(52) U.S. Cl.
CPC ............ *G10L 15/26* (2013.01); *G10L 15/197* (2013.01); *G10L 2015/0636* (2013.01)

(56) References Cited

U.S. PATENT DOCUMENTS

| | | | |
|---|---|---|---|
| 2013/0317755 A1* | 11/2013 | Mishra | G16B 30/00 702/20 |
| 2016/0171974 A1* | 6/2016 | Hannun | G10L 15/063 704/232 |
| 2016/0321777 A1* | 11/2016 | Jin | G06F 9/5016 |
| 2017/0011738 A1* | 1/2017 | Senior | G10L 15/063 |
| 2017/0098153 A1* | 4/2017 | Mao | G06N 3/0445 |
| 2017/0103752 A1* | 4/2017 | Senior | G10L 15/16 |
| 2017/0148431 A1* | 5/2017 | Catanzaro | G10L 15/02 |
| 2017/0148433 A1* | 5/2017 | Catanzaro | G10L 15/02 |
| 2018/0011688 A1* | 1/2018 | Wei | G06F 3/167 |
| 2018/0061439 A1* | 3/2018 | Diamos | G10L 21/10 |
| 2018/0247643 A1* | 8/2018 | Battenberg | G10L 15/02 |

OTHER PUBLICATIONS

Graves et al., "Connectionist Temporal Classification: Labelling Unsegmented Sequence Data with Recurrent Neural Networks," In Proceedings of the 23rd international conference on Machine learning, 2006. (8 pgs).
Cho et al., "Learning phrase representations using RNN Encoder-Decoder for statistical machine translation," arXiv preprint, arXiv:1406.1078, 2014.(14 pgs).
Sutskever et al., "Sequence to sequence learning with neural networks," In Advances in neural information processing systems, 2014. (9 pgs).
Chan et al., "Listen, attend and spell: A neural network for large vocabulary conversational speech recognition," In 2016 IEEE on (ICASSP), 2016. (5 pgs).
Hannun et al.," Deep Speech: Scaling up End-to-End speech recognition," CoRR, abs/1412.5567, 2014. (12 pgs).
Bahdanau et al., "End-to-End Attention-Based large vocabulary speech recognition," In 2016 IEEE on (ICASSP), 2016. (5 pgs).
Sébastien et al.,"On using very large target vocabulary for neural machine translation," 2015. (10 pgs).
Vinyals et al., "Grammar as a foreign language," In Advances in Neural Information Processing Systems, pp. 2773-2781, 2015. (9 pgs).
Chorowski et al., "Attention-based models for speech recognition," In Advances in Neural Information Processing Systems, 2015. (9 pgs).
Xiong et al.,"The microsoft 2016 conversational speech recognition system," arXiv preprint, arXiv:1609.03528, 2016a. (5 pgs).
Wu et al.,"Google's neural machine translation system: Bridging the gap between human and machine translation," CoRR, abs/1609.08144, 2016a. (23 pgs).
Chan et al.,"Latent Sequence Decompositions," In Arxiv, 2016b. Retrieved from Internet < URL:https://arxiv.org/pdf/1610.03035v1.pdf> (11pgs).
Amodei et al.,"Deep speech 2: End-to-End speech recognition in english and mandarin," arXiv preprint, arXiv:1512.02595, 2015. (28 pgs).
Wu et al.,"Google's neural machine translation system: Bridging the gap between human and machine translation," arXiv preprint, arXiv:1609.08144, 2016b. (23 pgs).
Collobert et al.,"Wav2letter: an End-to-End ConvNet-based speech recognition system," arXiv preprint, arXiv:1609.03193, 2016. (8 pgs).
Zweig et al.,"Advances in All-Neural speech recognition," arXiv preprint, arXiv:1609.05935, 2016a. (5 pgs).
Soltau et al.,"Neural speech recognizer: Acoustic-to-Word LSTM model for large vocabulary speech recognition," arXiv preprint, arXiv:1610.09975, 2016. (6 pgs).
Lee & Hon,"Large-vocabulary speaker independent continuous speech recognition using HMM," In Acoustics, Speech, and Signal Processing, 1988. (6 pgs).
Sercu & Goel,"Dense prediction on sequences with time-dilated convolutions for speech recognition," arXiv preprint, arXiv:1611.09288, 2016. (5 pgs).
Xiong et al.,"Achieving human parity in conversational speech recognition," arXiv preprint, arXiv:1610.05256, 2016b. (12 pgs).
Chan et al.,"Listen, attend and spell," arXiv preprint, arXiv:1508.01211, 2015. (12 pgs).
Doss et al.,"Phoneme-Grapheme based speech recognition system," In Automatic Speech Recognition and Understanding, 2003. (5 pgs).
Chung et al.,"Hierarchical Multiscale Recurrent Neural Networks," arXiv preprint, arXiv:1609.01704, 2016. (15 pgs).
Luong & Manning,"Achieving open vocabulary neural machine translation with hybrid word-character models," arXiv preprint, arXiv:1604.00788, 2016.(11 pgs).
Sak et al.,"Fast and accurate recurrent neural network acoustic models for speech recognition," CoRR, abs/1507.06947, 2015. (5 pgs).
Kim et al., Joint CTC-Attention based End-to-End speech recognition using Multi-task learning, arXiv preprint arXiv:1609.06773, 2016. (5 pgs).
Kim & Rush, "Sequence-Level Knowledge Distillation," arXiv preprint, arXiv:1606.07947, 2016. (11 pgs).
Miao et al.,"Eesen: End-to-end speech recognition using deep RNN models and wfst-based decoding," In (ASRU), 2015 IEEE Workshop, 2015. (8 pgs).
Zhang et al.,"Very deep convolutional networks for End-to-End speech recognition," arXiv preprint, arXiv:1610.03022, 2016. (5 pgs).
Zweig et al.,"Advances in All-Neural Speech Recognition," arXiv preprint, arXiv:1609.05935, 2016b,Retrieved from Internet < URL:https://arxiv.org/pdf/1609.05935v1.pdf> (5 pgs).
Povey et al.,"Purely sequence-trained neural networks for ASR based on lattice-free MMI," Submitted to Interspeech, 2016. (5 pgs).
Cartwright et al.,"Segmenting speech without a lexicon: The roles of phonotactics and speech source," arXiv preprint, cmplg/9412005, 1994. Retrieved from Internet< URL:https://arxiv.org/pdf/cmp-lg/9412005.pdf> (8 pgs).
Goldwater et al.,"Contextual dependencies in unsupervised word segmentation," In Proceedings of the 21st International Conference on Computational Linguistics and the 44th annual meeting of the Association for Computational Linguistics, pp. 673-680. Association for Computational Linguistics, 2006. (8 pgs).
Chorowski & Navdeep,"Towards better decoding and language model integration in sequence to sequence models," arXiv preprint, arXiv:1612.02695, 2016. Retrieved from Internet< URL:https://arxiv.org/pdf/1612.02695.pdf> (6 pgs).

\* cited by examiner

SYSTEMS AND METHODS FOR AUTOMATIC UNIT SELECTION AND TARGET DECOMPOSITION FOR SEQUENCE LABELLING

CROSS-REFERENCE TO RELATED APPLICATION

This application claims the priority benefit under 35 USC § 119(e) to U.S. Prov. Pat. App. Ser. No. 62/463,503, filed on 24 Feb. 2017, entitled "SYSTEMS AND METHODS FOR AUTOMATIC UNIT SELECTION AND TARGET DECOMPOSITION FOR SEQUENCE LABELLING," and listing Hairong Liu, Zhenyao Zhu, and Sanjeev Satheesh as inventors. The aforementioned patent document is incorporated by reference herein in its entirety.

BACKGROUND

A. Technical Field

The present disclosure relates generally to systems and methods for computer learning that can provide improved computer performance, features, and uses.

B. Background

Computing devices play an ever increasingly complex and integral role in people's lives. Interestingly, even though computing devices perform substantially more complex and varied tasks, the skill level needed for lay people to use such computing devices tends to become simpler—thereby making them more accessible to a general population. To achieve computing devices that provide complex services but do so in an accessible manner requires the computing devices to become more intelligent. Increasing the ability of a computing device to learn, allows it to provide more robust services and provides easier, more intuitive ways for people to interface with the computing device.

One task that computing devices have been configured to learn is sequence prediction tasks. Most existing sequence labelling models rely on a fixed decomposition of a target sequence into a sequence of basic units. These methods suffer from at least two major drawbacks: 1) the set of basic units is fixed, such as the set of words, characters, or phonemes in speech recognition; and 2) the decomposition of target sequences is fixed. These drawbacks usually result in sub-optimal performance of modeling sequences.

Accordingly, what is needed are systems and methods that allow for automatic unit selection and target decomposition for sequence labelling, which improves the functioning and use of computing devices. Such systems and methods may be used to provide or improve computing device services, such as, by way of example, automatic speech recognition (ASR), handwriting recognition, machine translation, and image captioning, which in turn helps improve performance of, use of, and interfacing with computing devices.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 6 depicts max decoding results (without collapsing) by CTC and Gram-CTC embodiments on utterances from the Switchboard dataset, according to embodiments of the present disclosure.

DETAILED DESCRIPTION OF EMBODIMENTS

Figure 1:
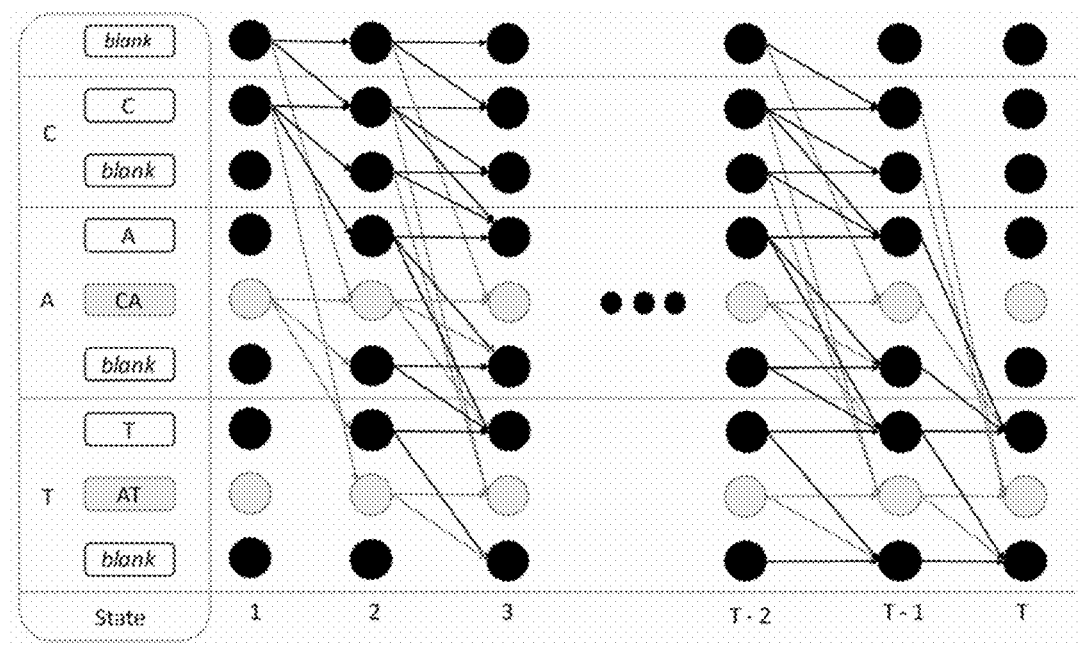
FIG. 1 depicts an illustration of the states and the forward-backward transitions for the label 'CAT' according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

In recent years, there has been an explosion of interest in sequence prediction tasks. Connectionist Temporal Classification (CTC) loss and Sequence-to-sequence (seq2seq) models present powerful approaches to multiple applications, such as Automatic Speech Recognition (ASR), machine translation and parsing. These methods may be based on: 1) a fixed and carefully chosen set of basic units, such as words, phonemes or characters; and 2) a fixed and pre-determined decomposition of target sequences into these basic units. While these two preconditions greatly simplify the problems, especially the training processes, they are also strict and unnecessary constraints, which usually lead to suboptimal solutions. CTC models are especially harmed by fixed basic units in target space, because they build on the independence assumption between successive outputs in that space—an assumption which is often violated in practice.

One of the problems with fixed set of basic units is that it is really hard, if not impossible, to determine the optimal set of basic units beforehand. For example, in English ASR, if words are used as basic units, a large vocabulary-sized softmax must be dealt with, as well as rare words and data sparsity problem. On the other hand, if characters are used as basic units, the model is forced to learn the complex rules of English spelling and pronunciation. For example, the "oh" sound can be spelled in any of following ways, depending on the word it occurs in: {o, oa, oe, ow, ough, eau, oo, ew}. While CTC can easily model commonly co-occurring grams together, it is impossible to give roughly equal probability to many possible spellings when transcribing unseen words. Some speech recognition systems model phonemes, sub-phoneme units and senones to get around these problems. Similarly, some state-of-the-art neural machine translation systems use pre-segmented word pieces aiming to find the best of both worlds.

In reality, groups of characters are typically cohesive units for many tasks. For the ASR task, words can be decomposed into groups of characters that can be associated with sound (such as 'tion' and 'eaux'). For the machine translation task, there may be values in decomposing words as root words and extensions (so that meaning may be shared explicitly between 'paternal' and 'paternity'). Since this information is already available in the training data, it is perhaps better to let the model figure it out by itself. At the same time, it raises another important question: how to decompose a target sequence into basic units? This is coupled with the problem of automatic selection of basic units, thus also better to let the model determine. Recently, there are some interesting attempts in these directions in the seq2seq framework. For example, Latent Sequence Decomposition has been proposed to decompose target sequences with variable length units as a function of both input sequence and the output sequence.

Presented herein are embodiments of a Gram-CTC—which may be considered as a strictly more general version of CTC—to automatically seek the best set of basic units from the training data, called grams, and automatically decompose target sequences into sequences of grams. Just as sequence prediction with cross-entropy training can be seen as special case of the CTC loss with a fixed alignment, CTC can be seen as a special case of Gram-CTC with a fixed decomposition of target sequences. Since it is a loss function, it can be applied to many seq2seq tasks to enable automatic selection of grams and decomposition of target sequences without modifying the underlying networks. Extensive experiments on multiple scales of data validate that embodiments of Gram-CTC can improve CTC in terms of both performance and efficiency, and that using Gram-CTC the models outperform state-of-the-arts on standard speech benchmarks.

B. Related Work

The basic text units that previous works utilized for text prediction tasks (e.g., automatic speech recognition, handwriting recognition, machine translation and image captioning) can be generally divided into two categories: hand-crafted ones and learning-based ones.

1. Hand-Crafted Basic Units

Fixed sets of characters (graphemes), word-pieces, words, and phonemes have been widely used as basic units for text prediction, but all of them have drawbacks.

- Word-segmented models remove the component of learning to spell and thus enable direct optimization towards reducing Word Error Rate (WER). However, these models may suffer from having to handle a large vocabulary, out-of-vocabulary words and data sparsity problems.
- Using characters results in much smaller vocabularies (e.g., 26 for English and thousands for Chinese), but it requires much longer contexts compared to using words or word-pieces and poses the challenge of composing characters to words, which is very noisy for languages like English.
- Word-pieces lie at the middle-ground of words and characters, providing a good trade-off between vocabulary size and context size, while the performance of using word pieces is sensitive to the choice of the word-piece set and its decomposition.
- For the ASR task, the use of phonemes was popular in the past few decades as it eases acoustic modeling and good results were reported with phonemic models. However, it introduces the uncertainties of mapping phonemes to words during decoding, which becomes less robust especially for accented speech data.

Using these aforementioned fixed deterministic decompositions of text sequences defines a prior, which is not necessarily optimal for end-to-end learning.

2. Learning-Based Basic Units

More recently, attempts have been made to learn basic unit sets along with the selection and decomposition of them automatically. For example, a multiscale RNN architecture has been leveraged to model the characters and words hierarchically, by building word-level representations on top of character-level representations. A hybrid Word-Character model was proposed to translate mostly at the word level and consults the character components for rare words. Latent Sequence Decompositions framework has been proposed to decompose target sequences with variable length-ed basic units as a function of both input sequence and the output sequence.

C. Embodiments of Gram-CTC

In this section, embodiment of the proposed Gram-CTC algorithm are presented.

1. CTC

CTC is a very popular method in seq2seq learning since it does not require the alignment information between inputs and outputs, which is usually expensive, if not impossible, to obtain.

Since there is no alignment information, CTC marginalizes over all possible alignments. That is, it tries to maximize $p(l|x)=\Sigma_\pi p(\pi|x)$, where x is input, and $\pi$ represent a valid alignment. For example, if the size of input is 3, and the output is 'hi', whose length is 2, there are three possible alignments, '-hi', 'h-i' and 'hi-', where '-' represents blank.

2. From CTC to Gram-CTC

In CTC, the basic units are fixed, which may not be desirable in some applications. In this disclosure, the CTC is generalized by considering a sequence of basic units, called gram, as a whole, which is usually more desirable in many applications.

Let G be a set of n-grams of the set of basic units C of the target sequence, and $\tau$ be the length of the longest gram in G. A Gram-CTC network has a softmax output layer with |G|+1 units, that is, the probability over all grams in G and one additional symbol, blank.

To simplify the problem, it may be assumed that $C \subseteq G$. This is because there may be no valid decompositions for some target sequences if $C \not\subseteq G$. Since Gram-CTC will figure out the ideal decomposition of target sequences into grams during training, this condition is harmless, and guarantees that there is at least one valid decomposition for every target sequence.

For an input sequence x of length T, let $y=N_w(x)$ be the sequence of network outputs, and denote by $y_k^t$ as the probability of the k-th gram at time t, where k is the index of grams in $G'=G\cup\{blank\}$, then $$p(\pi|x) = \prod_{t=1}^{T} y_{\pi_t}^t, \forall \pi \in G'^T \quad (1)$$

Just as in the case of CTC, here the elements of $G'^T$ may be referred to as paths, and denote them by $\pi$, which represents a possible alignment between input and output. The difference is that for each word in the target sequence, it may be decomposed into different sequences of grams. For example, the word hello can only be decomposed into the sequence ['h', 'e', 'l', 'l', 'o'] for CTC (assume uni-gram CTC here), but it also can be decomposed into the sequence ['he', 'll', 'o'] if 'he' and 'll' are in G.

In embodiments, for each $\pi$, it is mapped into a target sequence the same way as CTC using the collapsing function that 1) removes all repeated labels from the path and then 2) removes all blanks. Note that essentially it is these rules which determine the transitions between the states of adjacent time steps in FIG. 1.

FIG. 1 is an illustration of the states and the forward-backward transitions for the label 'CAT' according to embodiments of the present disclosure. Here G is the set of all uni-grams and bi-grams of the English alphabet. The set of all valid states S for the label l='CAT' are listed to the left. The set of states and transitions that are common to both vanilla (or plain) CTC and gram-CTC are in black, and those that are unique to Gram-CTC are in gray. In general, any extension that collapses back to 1 is a valid transition. For example, ('CAT', 1) can be transited from ('CAT', 1), ('CA', 2), ('CA', 1) and ('CA', 0) but not from (VAT, 0) or ('CAT', 2).

This is a many-to-one mapping and it is denoted by B. Other rules may be adopted here and the general idea presented in this disclosure does not depend on these specific rules. Thus, for a target sequence l, $B^{-1}(l)$ represents all paths mapped to l. Then, this yields $$p(l|x) = \sum_{\pi \in B^{-1}(l)} p(\pi|x) \quad (2)$$

This equation allows training sequence labeling models without any alignment information using CTC loss, because it marginalizes over all possible alignments during training. Gram-CTC uses the same effect to marginalize over not only alignments, but also a decomposition of the target sequence.

In embodiments, for each target sequence l, the set $B^{-1}(l)$ has $O(\tau^2)$ more paths than it does in vanilla CTC. This is because there are $O(\tau)$ times more valid states per time step, and each state may have a valid transition from $O(\tau)$ states in the previous time step. Thus, the original CTC method may be considered a special case of Gram-CTC when G=C and $\tau=1$. While the quadratic increase in the complexity of the algorithm is nontrivial, it may be asserted that it is a trivial increase in the overall training time of typical neural networks, where the computation time is dominated by the neural networks themselves. Additionally, the algorithm extends generally to any arbitrary G and need not have all possible n-grams up to length T.

3. Embodiments of the Forward-Backward Method

To efficiently compute p(l|x), in an embodiment, a dynamic programming method is also adopted. The essence of all dynamic programming is in identifying the states of the problem, so that future states may be solved by reusing solutions to earlier states. In embodiments, the state contains all the information required to identify all valid extensions of an incomplete path $\pi$ such that the collapsing function will eventually collapse the complete $\pi$ back to l. For embodiments of Gram-CTC, this may be done by collapsing all but the last element of the path $\pi$. Therefore, the state is a tuple $(l_{1:i}, j)$, where the first item is a collapsed path, representing a prefix of the target label sequence, and $j \in \{0, \ldots, \tau\}$ is the length of the last gram $(l_{i-j+1:i})$ used for making the prefix. Note that j=0 is valid and means that blank was used. The gram $l_{i-j+1:i}$ is denoted by $g_i^j(l)$ and the state $(l_{1:i}, j)$ as $s_i^j(l)$. For readability, $s_i^j(l)$ is further shortened to $s_i^j$ and $g_i^j(l)$ to $g_i^j$. For a state s, its corresponding gram, is denoted by $s_g$, and the positions of the first character and last character of $s_g$ are denoted by b(s) and e(s), respectively.

During dynamic programming, we are dealing with sequence of states, for a state sequence $\zeta$, its corresponding gram sequences is unique, denoted by $\zeta_g$.

FIG. 1 illustrates partially the dynamic programming process for the target sequence 'CAT'. Here, suppose G contains all possible uni-grams and bi-grams. Thus, for each character in 'CAT', there are three possible states associated with it: 1) the current character, 2) the bi-gram ending in current character, and 3) the blank after current character. There is also one blank at the beginning. In total, there are 10 states.

Suppose the maximum length of grams in G is $\tau$, in embodiments, l is scanned to get the set S of all possible states, such that for all $s_i^j \in S$, its corresponding $g_i^j \in G'$. Note that $i \in \{0, \ldots, |l|\}$ and $j \in \{0, \ldots, \tau\}$.

For a target sequence l, define the forward variable $\alpha_t(s)$ for any $s \in S$ to the total probability of all valid paths prefixes that end at state s at time t.

$$\alpha_t(s) \stackrel{def}{=} \sum_{\zeta|B(\zeta_g)=l_{1:e(s)}, \zeta_t=s} \prod_{t'=1}^{t} y_{\zeta_{t'}g}^{t'} \quad (3)$$

Following this definition, one can have the following rules for initialization $$\alpha_1(s) = \begin{cases} y_b^1 & s = s_0^0 \\ y_{s_i^1}^1 & s = s_i^1 \quad \forall i \in \{1, \ldots, \tau\} \\ 0 & \text{otherwise} \end{cases} \quad (4)$$

and recursion $$\alpha_t(s) = \begin{cases} \hat{\alpha}_{t-1}^i * y_b^t \\ \quad \text{when } s = s_i^0, \\ [\hat{\alpha}_{t-1}^{i-j} + \alpha_{t-1}(s)] * y_{g_i^j}^t \\ \quad \text{when } s = s_i^j \text{ and } g_i^j \neq g_{i-j}^j, \\ [\hat{\alpha}_{t-1}^{i-j} + \alpha_{t-1}(s) - \alpha_{t-1}(s_{i-j}^j)] * y_{g_i^j}^t \\ \quad \text{when } s = s_i^j \text{ and } g_i^j = g_{i-j}^j \end{cases} \quad (5)$$

where $\hat{\alpha}_t^i = \sum_{j=0}^{\tau} \alpha_t(s_i^j)$ and $y_b^t$ is the probability of blank at time t.

The total probability of the target sequence l is then expressed in the following way:

$$p(l|x) = \sum_{j=0}^{\tau} \alpha_T(s_{|l|}^j) \quad (6)$$

similarly, the backward variable $\beta_t(s)$ may be defined as:

$$\beta_t(s) \stackrel{def}{=} \sum_{\zeta|B(\zeta_g)=l_{b(s):|l|}, \zeta_t=s} \prod_{t'=t}^{T} y_{\zeta_{t'}g}^{t'} \quad (7)$$

For the initialization and recursion of $\beta_t(s)$, one can have:

$$\beta_T(s) = \begin{cases} y_b^T & s = s_T^0 \\ y_{g_T^i}^T & s = s_T^i \quad \forall i \in \{1, \ldots, \tau\} \\ 0 & \text{otherwise} \end{cases} \quad (8)$$

and $$\beta_t(s) = \begin{cases} \hat{\beta}_{t+1}^i * y_b^t \\ \quad \text{when } s = s_i^0, \\ [\hat{\beta}_{t+1}^{i+j} + \beta_{t+1}(s)] * y_{g_i^j}^t \\ \quad \text{when } s = s_i^j \text{ and } g_i^j \neq g_{i+j}^j, \\ [\hat{\beta}_{t+1}^{i+j} + \beta_{t+1}(s) - \beta_{t+1}(s_{i+j}^j)] * y_{g_i^j}^t \\ \quad \text{when } s = s_i^j \text{ and } g_i^j = g_{i+j}^j \end{cases} \quad (9)$$

Where $\hat{\beta}_t^i = \sum_{j=0}^{\tau} \beta_t(s_{i+j}^j)$.

4. Embodiments of BackPropagation

Similar to CTC, there is the following expression:

$$p(l|x) = \sum_{s \in S} \frac{\alpha_t(s)\beta_t(s)}{y_{s_g}^t} \forall t \in \{1, \ldots, T\} \quad (10)$$

The derivative with regards to $y_k^t$ may be expressed as:

$$\frac{\partial p(l|x)}{\partial y_k^t} = \frac{1}{y_k^{t2}} \sum_{s \in lab(l,k)} \alpha_t(s)\beta_t(s) \quad (11)$$

where lab(l, k) is the set of states in S whose corresponding gram is k. This is because there may be multiple states corresponding to the same gram.

For the backpropagation, one of the most important formulas is the partial derivative of loss with regard to the unnormalized output $u_k^t$.

$$\frac{\partial \ln p(l|x)}{\partial u_k^t} = y_k^t - \frac{1}{y_k^t Z_t} \sum_{s \in lab(l,k)} \alpha_t(s)\beta_t(s) \quad (12)$$

where $Z_t \stackrel{def}{=} \sum_{s \in S} \frac{\alpha_t(s)\beta_t(s)}{y_{s_g}^t}$.

D. Methodology Embodiments

In this section, additional techniques are described that have been found to be useful in practice with embodiments to help the Gram-CTC to work efficiently as well as effectively.

1. Iterative Gram Selection Embodiments

Figure 2:
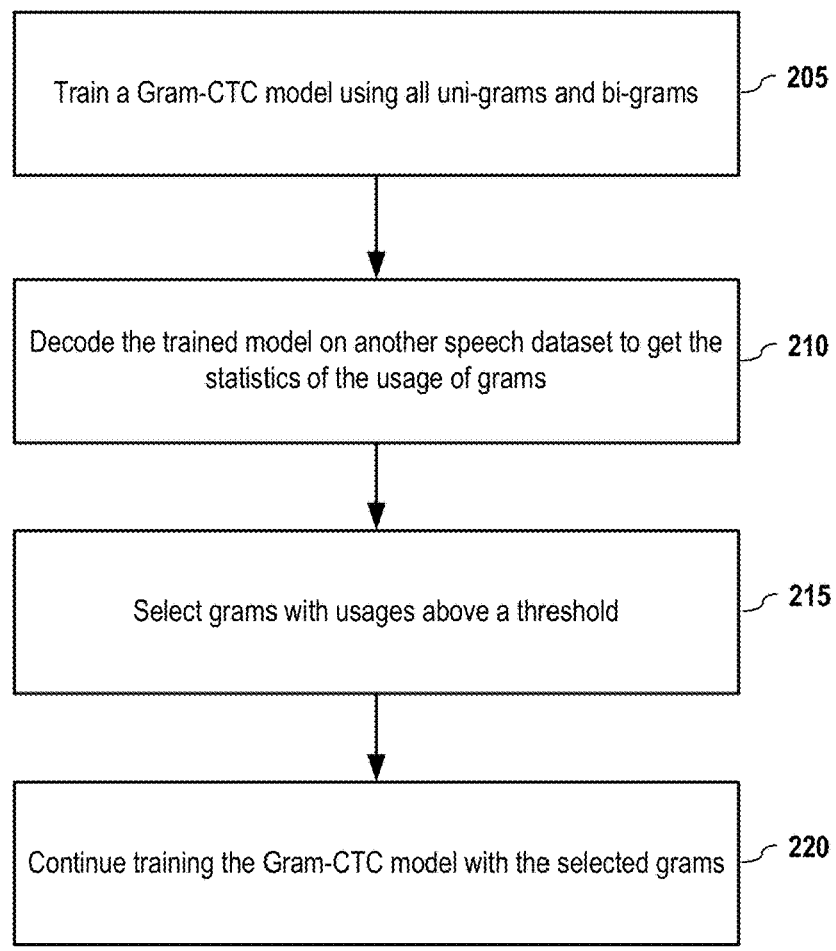
FIG. 2 depicts a method for iterative Gram selection according to embodiments of the present disclosure.

Although Gram-CTC can automatically select useful grams, it is challenging to train with a large G. The total number of possible grams is usually huge. For example, in English, there are 26 characters, then the total number of bi-grams is $26^2 = 676$, the total number of tri-grams are $26^3 = 17576, \ldots$, which grows exponentially and quickly becomes intractable. However, it is unnecessary to consider many grams, such as "aaaa", which are obviously useless. In some embodiments, most of useless grams were eliminated from the statistics of a huge corpus. FIG. 2 depicts a method for iterative Gram selection according to embodiments of the present disclosure. In step 205, a Gram-CTC model is first trained using all uni-grams and bi-grams (29 uni-grams and $26^2$=676 bi-grams, in total 705 grams). In step 210, the trained model is decoded on another speech dataset to get the statistics of the usage of grams. By applying (decoding) the trained model on a large speech dataset, the real statistics of gram's usage are obtained. In step 215, grams with usages above a threshold are selected. Ultimately, the high frequency grams together with all uni-grams were chosen as a final gram set G. That is, the frequency of each gram in the corpus was counted and these grams with rare frequencies were dropped. For example, the Top 100 bi-grams together with all 29 uni-grams (auto-refined grams) were used for the second round of training. Then, in step 220, the Gram-CTC model was trained on all of the remaining grams. Table 1 shows the impact of iterative gram selection on WSJ (without LM).

TABLE 1

Results of different gram selection methods on the Wall Street Journal (WSJ) dataset

| Loss | WER |
| --- | --- |
| CTC, uni-gram | 16.91 |
| CTC, bi-gram | 21.63 |
| Gram-CTC, handpick | 17.01 |
| Gram-CTC, all uni-grams + bi-grams | 16.89 |
| Gram-CTC, auto-refinement | 16.66 |

Figure 3A:
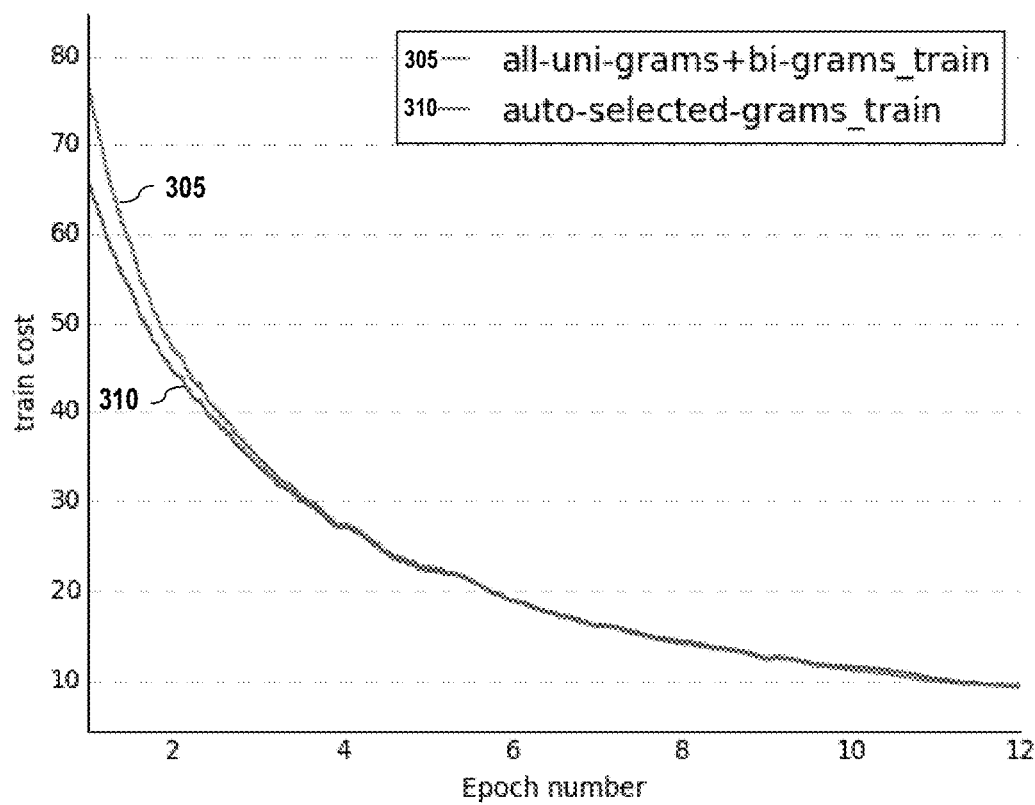
FIG. 3(a) compares the training curves before (305) and after (310) auto-refinement of grams according to embodiments of the present patent document.

FIG. 3(a) shows its corresponding training curve 300. FIG. 3(a) compares the training curves before (305) and after (310) auto-refinement of grams according to embodiments of the present patent document. They look very similar, although the number of grams is greatly reduced after refinement, which makes training faster and potentially more robust due to less gram sparsity. Further details can be found in Section E.2.

2. Embodiments of Joint Training with Vanilla CTC

In embodiments, Gram-CTC solves both decomposition and alignment tasks, which is a harder task for a model to learn than CTC. This is often manifested in unstable training curves, which can force the lowering of the learning rate, which in turn results in models converging to a worse optima. To overcome this difficulty, it may be beneficial to train a model with both the Gram-CTC, as well as the vanilla CTC loss.

Figure 3B:
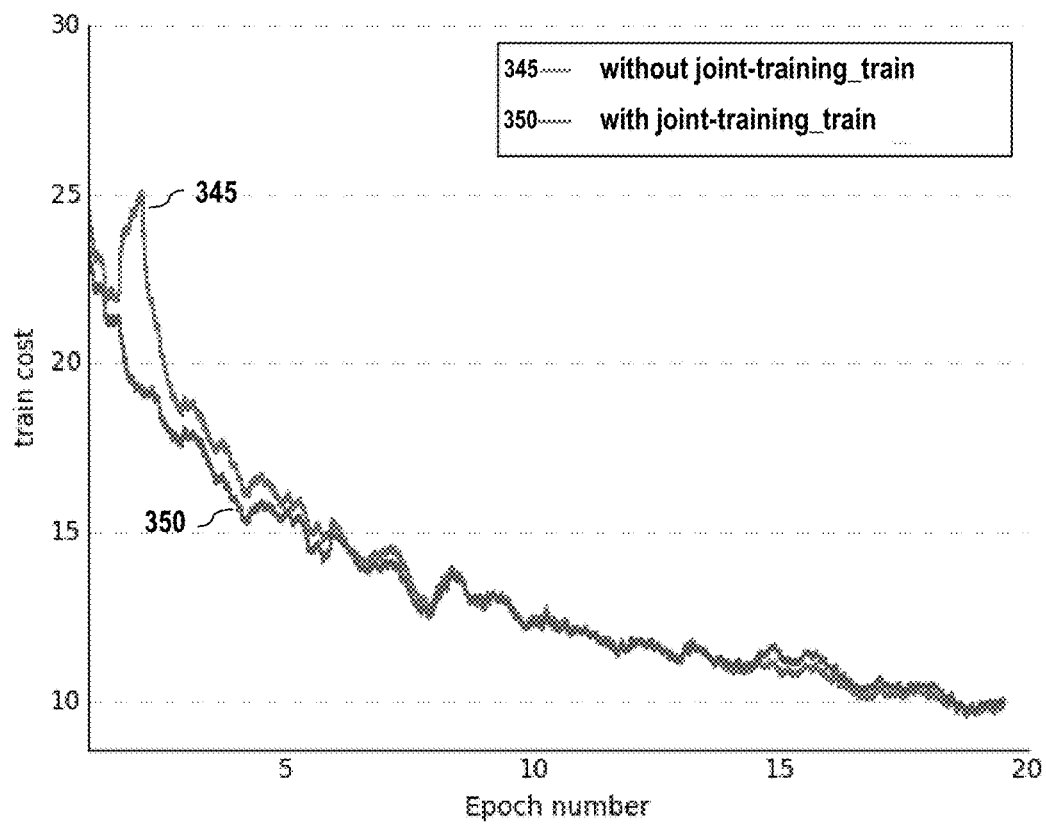
FIG. 3(b) depicts the training curves of models with and without joint-training according to embodiments of the present patent document.
Figure 3C:
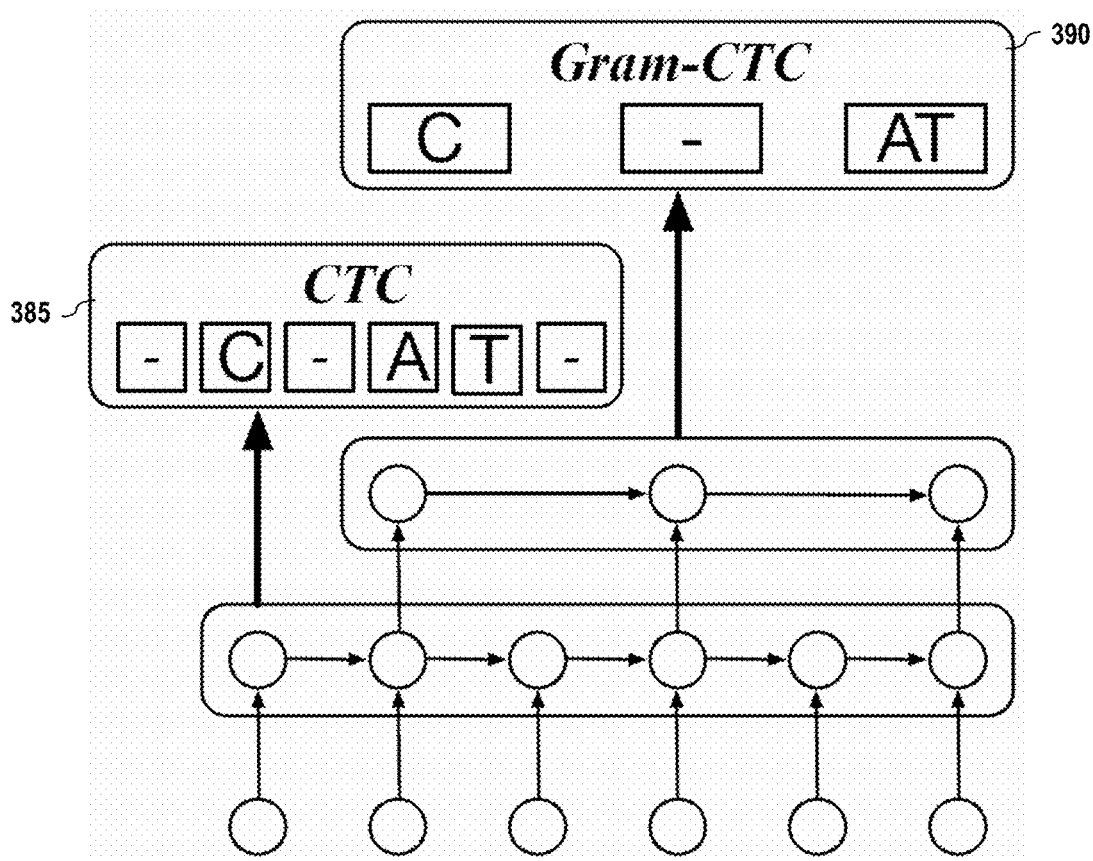
FIG. 3(c) depicts a typical joint-training model architecture according to embodiments of the present disclosure.

A typical joint-training model looks like FIG. 3(c), and the corresponding training curve is shown in FIG. 3(b) (340). Specifically, FIG. 3(b) depicts the training curve of models with 350 and without 345 joint-training according to embodiments of the present patent document. The model corresponding to training curve 350 is jointly trained together with vanilla CTC—such models are often more stable during training. FIG. 3(c) depicts a typical joint-training model architecture 380 according to embodiments of the present disclosure. Note that, in embodiments, the vanilla CTC loss 385 is typically best applied a few levels lower than the Gram-CTC loss 390. Some of the effects of joint-training are shown in Table 4 and Table 5 in the experiments section, below.

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Figure 4:
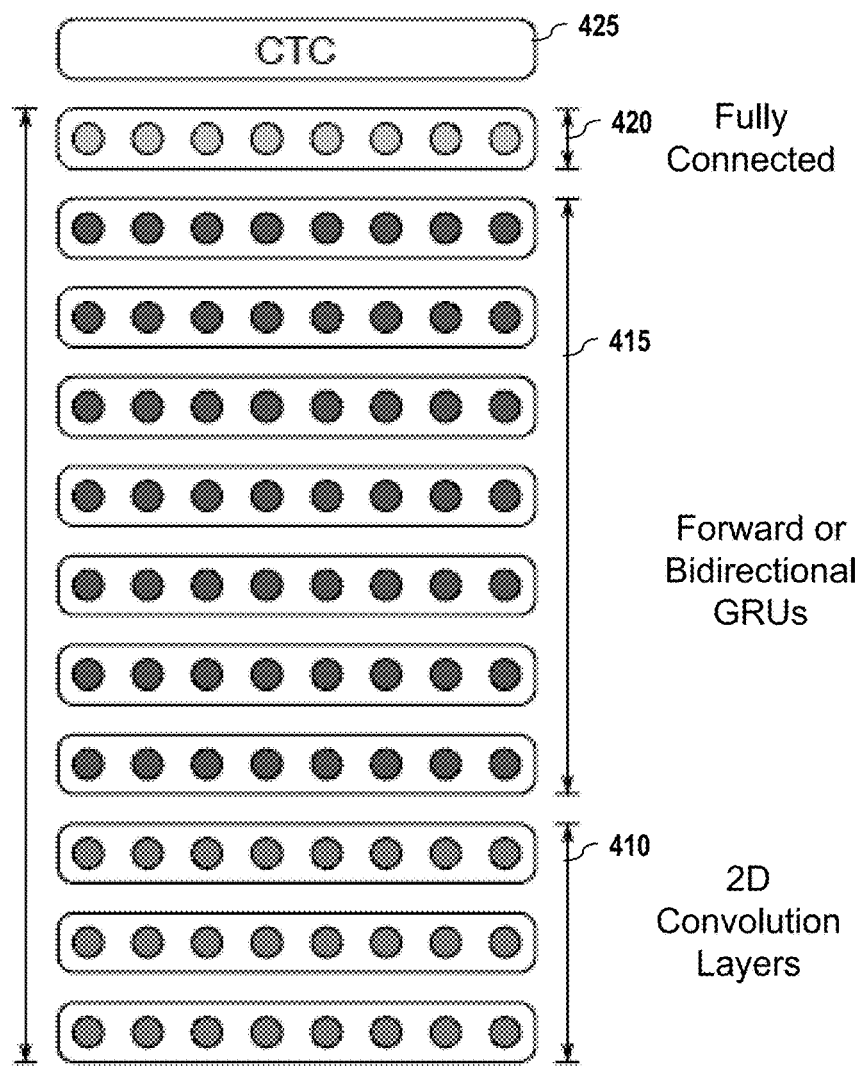
FIG. 4 depicts a model structure trained end-to-end with the CTC, Gram CTC, or a weighted combination of both, according to embodiments of the present disclosure.

Embodiments of the Gram-CTC loss were tested on the ASR task, while it should be noted that both CTC and the presently introduced Gram-CTC are generic techniques for other sequence labelling tasks. For all of the experiments, the model specification and training procedure were the same as an embodiment depicted in by Amodei et al., in Deep speech 2: End-to-end speech recognition in English and Mandarin, arXiv preprint arXiv:1512.02595, 2015. FIG. 4 shows the exemplary model structure used for the training procedure. The model 400 was a recurrent neural network (RNN) with 2 two-dimensional convolutional input layers 410, followed by K forward (Fwd) or bidirectional (Bidi) Gated Recurrent layers 415, N cells each, and one fully connected layer before a softmax layer 420. In short hand, such a model is written as '2×2D Conv—K×N GRU'. The network was trained end-to-end with the CTC, Gram-CTC, or a weighted combination of both 525. This combination is described in the earlier section.

Figure 5:
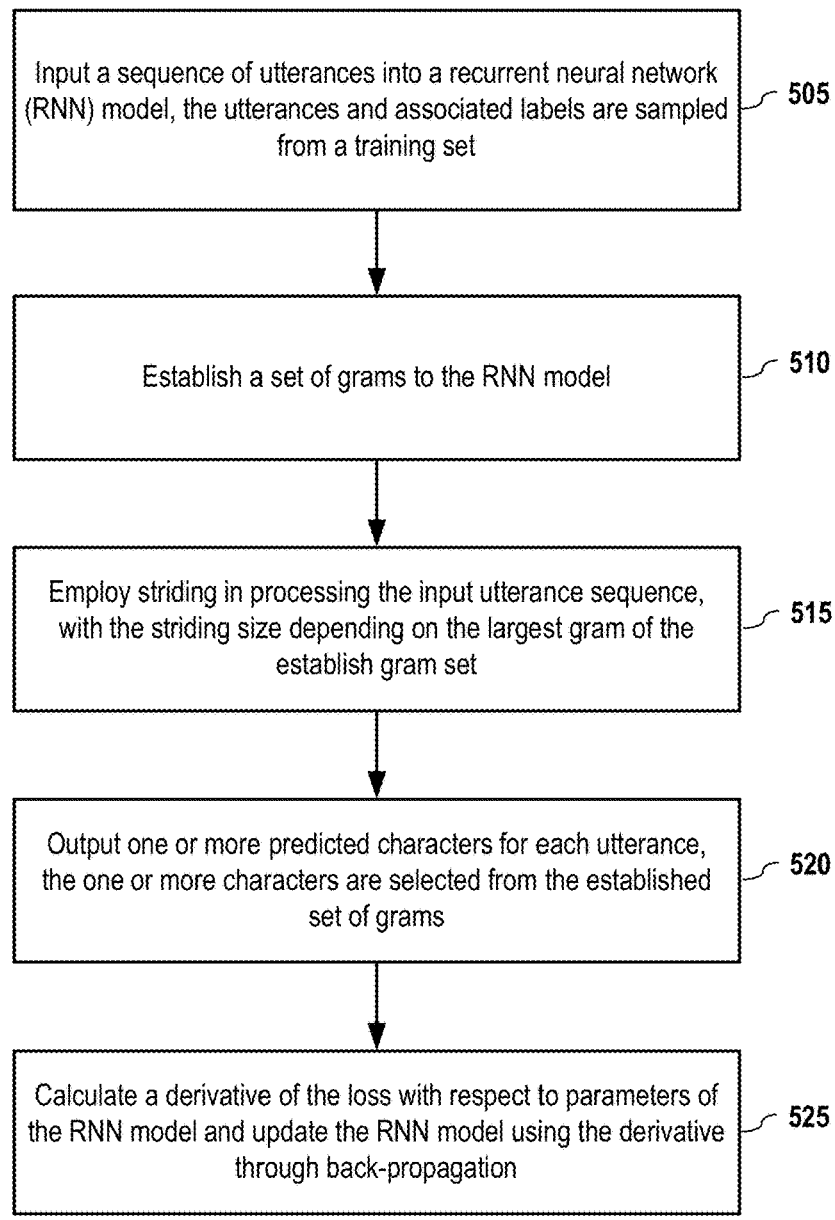
FIG. 5 depicts a method for training a deep learning model with Gram-CTC function according to embodiments of the present disclosure.

FIG. 5 depicts a method for training the RNN model with Gram-CTC function according to embodiments of the present disclosure.

In step 505, a sequence of utterances is inputted into the recurrent neural network (RNN) model, wherein the utterances and associated labels are sampled from a training set. In all experiments, audio data was sampled at 16 kHz. Linear Fast Fourier transform (FFT) features were extracted with a hop size of 10 ms and window size of 20 ms, and were normalized so that each input feature has zero mean and unit variance. The network inputs were thus spectral magnitude maps ranging from 0-8 kHz with 161 features per 10 ms frame. At each epoch, 40% of the utterances were randomly selected to add background noise to. The optimization method used was a stochastic gradient descent with Nesterov momentum. Learning hyperparameters (batch-size, learning-rate, momentum, and etc.) varied across different datasets and were tuned for each model by optimizing a hold-out set. Typical values were a learning rate of $10^{-3}$ and momentum of 0.99.

1. Data and Setup

Wall Street Journal (WSJ).

This corpora consists primarily of read speech with texts drawn from a machine-readable corpus of Wall Street Journal news text, and contains about 80 hours speech data. The standard configuration of train si284 dataset is used for training, dev93 for validation and eval92 for testing. This is a relatively 'clean' task and often used for model prototyping.

Fisher-Switchboard.

This is a commonly used English conversational telephone speech (CTS) corpora, which contains 2300 hours CTS data. Following previous works, evaluation is carried out on the NIST 2000 CTS test set, which comprises both Switchboard (SWB) and CallHome (CH) subsets.

10K Speech Dataset.

Large scale ASR experiments were conducted on a noisy internal dataset of 10,000 hours. This dataset contains speech collected from various scenarios, such as different background noises, far-field, different accents, and so on. Due to its inherent complexities, it is a very challenging task, and can thus validate the effectiveness of the proposed method for real-world application.

2. Gram Selection

In step 510, a set of grams is established for training the RNN model. The WSJ dataset was employed for demonstrating different strategies of selecting grams for Gram-CTC, since it is a widely used dataset and also small enough for rapid idea verification. However, because it is small, large grams could not be used here due to data sparsity problem. Thus, the auto-refined gram set on WSJ is not optimal for other larger datasets, where larger grams could be effectively used, but the procedure of refinement is the same for them.

In an embodiment, a model is first trained using all uni-grams and bi-grams (29 uni-grams and $26^2=676$ bi-grams, in total 705 grams), and then decoded with the obtained model on another speech dataset to get the statistics of the usage of grams. The Top 100 bi-grams together with all 29 uni-grams (auto-refined grams) were used for the second round of training. For comparison, the result of the best handpicked grams, as well as the results on uni-grams, are presented in Table 1.

Some interesting observations can be found in Table 1. First, the performance of auto-refined grams is slightly better than the combination of all uni-grams and all bi-grams. This is likely because WSJ is so small that gram learning suffers from the data sparsity problem here (similar to word-segmented models). Auto-refined grams contains only a small subset of bi-grams, thus are more robust. This is also why, in embodiments, only bi-grams are tried, not including higher-order grams. Second, the performance of best handpicked grams is worse than auto-refined grams. This is desirable. It is time-consuming to handpick grams, especially when you consider high-order grams. The method of iterative gram selection is not only fast, but usually better. Third, the performance of Gram-CTC on auto-refined grams is only slightly better than CTC on uni-grams. This is because Gram-CTC is inherently difficult to train, since it needs to learn both decomposition and alignment. WSJ is too small to provide enough data to train Gram-CTC.

3. Sequence Labelling in Large Stride

Using a large global stride in recurrent neural networks can greatly boost its overall efficiency, since it effectively reduces the time steps for recurrent computation, thus speeds up the process of both forward inference and backward propagation. However, the largest stride that can be used is limited by the gram set that is used. The (uni-gram) CTC typically has to work in a high time resolution (small stride) in order to have enough number of frames to output every character. This is very inefficient as it is known that the same acoustic features could correspond to grams of different lengths (e.g., {'i', 'igh', 'eye'}). The larger the grams are, the larger stride are potentially to be used.

In step 515, striding is employed in processing the input utterance sequence, with the striding size depending on the largest gram of the gram set established in step 410. In Deep Speech 2 (DS2), Amodei et al. employed non-overlapping bigram outputs in embodiments to allow for a larger stride in convolutions. This imposes an artificial constraint forcing the model to learn, not only the spelling of each word, but also how to split words into bigrams. For example, in embodiments, part is split as [pa, rt] but the word apart is forced to be decomposed as [ap, ar, t]. Gram-CTC removes this constraint by allowing the model to decompose words into larger units into the most convenient or sensible decomposition. Comparison results show this change enables Gram-CTC to work much better than bi-gram CTC, as in Table 2.

TABLE 2

Performances with different model strides

| Loss (stride) | WER | | Epoch Time (mins) | |
|---|---|---|---|---|
| | 2 | 4 | 2 | 4 |
| CTC, uni-gram | 16.91 | 23.76 | 29 | 16 |
| CTC, bi-gram | 20.57 | 21.63 | 23 | 12 |
| Gram-CTC | 16.66 | 18.87 | 35 | 18 |

In Table 2, the performance of trained model and training efficiency are compared on two strides, 2 and 4. For Gram-CTC, the auto-refined gram set from previous section is used. As expected, using stride 4 almost cuts the training time per epoch into half, compared to stride 2. From stride 2 to stride 4, the performance of uni-gram CTC drops quickly. This is because small grams inherently needs higher time resolutions. As for Gram-CTC, from stride 2 to stride 4, its performance decreases a little bit, though in the experiments using the other datasets, Gram-CTC is better in stride 4. One possible explanation is that WSJ is too small for Gram-CTC to learn large grams well. In contrast, the performance of bi-gram CTC is not as good in either stride.

4. Decoding Examples

In step 520, the RNN model outputs one or more predicted characters for each utterance of the input utterance sequence. The one or more predicted characters are selected from the established set of grams. In step 525, a Connectionist Temporal Classification (CTC) loss function is implemented to obtain a loss of the predicted one or more characters for each utterance given the associated labels. The CTC loss function implementation involving forward-backward transitions, as described in FIG. 1, section C.1., and C.2. The obtained loss is then used to calculate a derivative of the loss with respect to parameters of the RNN model and to update the RNN model through back-propagation, which is described in Section C.3.

Figure 6:
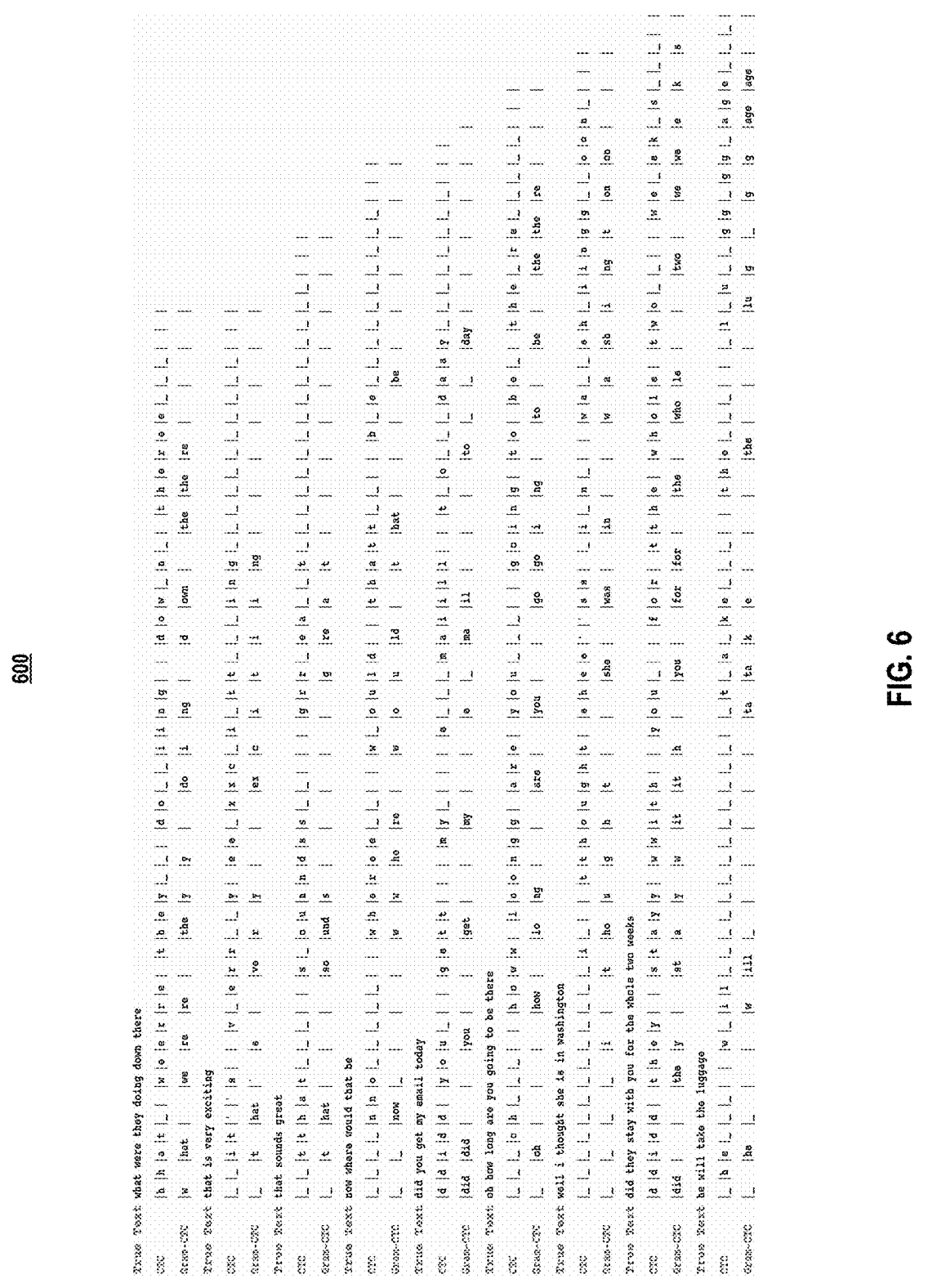

FIG. 6 illustrates the decoding results 600 of both CTC and Gram-CTC embodiments on nine utterances according to embodiments of the present patent document. The predicted characters (by CTC) or grams (by Gram-CTC) at each timestep are separated by "|". As the Gram-CTC model is trained with doubled stride as that of CTC model, the grams are placed at a doubled width as characters for better viewing. The "_" represents blank.

In the depicted embodiments, the label set for CTC is the set of all characters, and the label set for Gram-CTC is an auto-refined gram set containing all uni-grams and some high frequent high-order grams. In the depicted embodiments, Gram-CTC uses stride 4 while CTC uses stride 2. From FIG. 6, it can be found that:

1) Gram-CTC does automatically find many intuitive and meaningful grams, such as 'the', 'ng', and 'are'.

2) It also decomposes the sentences into segments which are meaningful in terms of pronunciation. This decomposition resembles the phonetic decomposition, but in larger granularity and arguably more natural.

3) Since Gram-CTC predicts a chunk of characters (a gram) each time, each prediction utilizes larger context and these characters in the same predicted chunk are dependent, thus potentially more accurate. One example is the word 'will' in the last sentence in FIG. 6.

4) Since the output of network is the probability over all grams, the decoding process is almost the same as CTC, still end-to-end. This makes such decomposition superior to phonetic decomposition.

In summary, Gram-CTC combines the advantages of both CTC on characters and CTC on phonemes.

5. Comparison with Other Methods a) WSJ Dataset

The model used here is [2×2D cony, 3×1280 Bidi GRU] with a CTC or Gram-CTC loss. The results are shown in Table 3.

TABLE 3

Comparison with previous published results with end-to-end training on WSJ speech dataset

| Architecture | WER |
| --- | --- |
| Phoneme CTC + trigram LM [1] | 7.3 |
| Grapheme CTC + trigram LM [1] | 9.0 |
| Attention + trigram LM [2] | 9.3 |
| DeepConv LAS + no LM [3] | 10.5 |
| DeepConv LAS + LSD + no LM [4] | 9.6 |
| Temporal LS + Cov + LM [5] | 6.7 |
| Vanilla CTC + no LM (by present disclosure) | 16.91 |
| Vanilla CTC + LM (by present disclosure) | 7.11 |
| Gram-CTC + no LM (by present disclosure) | 16.66 |
| Gram-CTC + LM (by present disclosure) | 6.75 |

Where:
[1] = Yajie Miao, Mohammed Gowayyed, and Florian Metze. "Eesen: End-to-end speech recognition using deep rnn models and wfst-based decoding", which is available at *Automatic Speech Recognition and Understanding* (ASRU), 2015 IEE Workshop on, pages 167-174. IEEE, 2015, and which is incorporated by reference herein in its entirety;
[2] = Dzmitry Bahdanau, Jan Chorowski, Dmitriy Serdyuk, Yoshua Bengio, et al. "End-to-end attention-based large vocabulary speech recognition", which is available at In 2016 IEEE International Conference on Acoustics, Speech, and Signal Processing (ICASSP), pages 4945-4949, IEEE, 2016, and which is incorporated by reference herein in its entirety;
[3] = Yu Zhang, William Chan, and Navdeep Jaitly. "Very deep convolutional networks for end-to-end speech recognition", which is available at arXiv preprint arXiv:1610.03022, 2016, and which is incorporated by reference herein in its entirety;
[4] = William Chan, Yu Zhang, Quoc Le, and Navdeep Jaitly. "Latent sequence decompositions", which is available at Arxiv, 2016b, and which is incorporated by reference herein in its entirety;
[5] = Jan Chorowski and Jaitly Navdeep. "Towards better decoding and language model integration in sequence to sequence models", which is available at. arXiv preprint arXiv:16212.02695, 2016. and which is incorporated by reference herein in its entirety.

For all models trained, language models can greatly improve their performances, in term of WER. Though this dataset contains very limited text data for learning gram selection and decomposition, the Gram-CTC can still improve the vanilla CTC notably.

b) Fisher-Switchboard

The acoustic model trained here is composed of two 2D convolutions and six bidirectional GRU layer in 2048 dimension. The corresponding labels are used for training N-gram language models.

Switchboard English speech 97S62
Fisher English speech Part 1-2004S13, 2004T19
Fisher English speech Part 2-2005S13, 2005T19

A sample of the Switchboard-1 portion of the NIST 2002 dataset (2004S11 RT-02) was used for tuning language model hyper-parameters. The evaluation was done on the NIST 2000 set. Together, this configuration forms a standard benchmark for evaluating ASR models. The results are shown in Table 4.

TABLE 4

Comparison with the best published results on Fisher-Switchboard benchmark benchmark ("SWBD" and "CH" represent Switchboard and Callhome portions, respectively) using in-domain data (only results using single models are listed here).

| Architecture | SWBD WER | CH WER |
| --- | --- | --- |
| Iterated-CTC [1] | 11.3 | 18.7 |
| BLSTM + LF MMI [2] | 8.5 | 15.3 |
| LACE + LF MMI [3] | 8.3 | 14.8 |
| Dilated convolutions [4] | 7.7 | 14.5 |
| Vanilla CTC (by present disclosure) | 9.0 | 17.7 |
| Gram-CTC (by present disclosure) | 7.9 | 15.8 |
| Vanilla CTC + Gram-CTC (by present disclosure) | 7.3 | 14.7 |

Where:
[1] = Geoffery Zweig, Ghengzhu Yu, Jasha Droppo, and Andreas Stolcke. "Advances in all-neural speech recognition", which is available at arXiv preprint arXiv: 1609.05935, 2016 and which is incorporated by reference herein in its entirety;
[2] = Daniel Povey, Vijayaditya Peddinti, Daniel Galvez, Pegah Ghahrmani, Vimal Manohar, Xingyu Na, Yiming Wang, and Sanjeev Khudanpur. "Purely sequence-trained neural networks for asr based on lattice-free mmi", which was submitted to Interspeech, 2016 and which is incorporated by reference herein in its entirety;
[3] = Wayne Xiong, Jasha Droppo, Xuedong Huang, Frank Seide, Mike Seltzer, Andreas Stolcke, Dong Yu, and Geoffrey Zweig. "Achieving human parity in conversational speech recognition", which is available at arXiv preprint arXiv: 1610.05256, 2016 and which is incorporated by reference herein in its entirety;
[4] = Tom Sercu and Vaibhava Goel. "Dense prediction on sequences with time-dilated convolutions for speech recognition", which is available at arXiv preprint arXiv: 1611.09288, 2016 and which is incorporated by reference herein in its entirety.

An embodiment of the model was compared against the best published results on in-domain data. These results can often be improved using out-of-domain data for training the language model, and sometimes the acoustic model as well. Together these techniques allow (Xiong et al., 2016b) to reach a WER of 5.9 on the SWBD set.

c) 10K Speech Dataset

Finally, a large noisy dataset collected for building large-vocabulary Continuous Speech Recognition (LVCSR) systems was experimented. This dataset contains about 10000 hours speech in a diversity of scenarios, such as far-field, background noises, accents. In all cases, the embodiment of the model was [2×2D Cony, 3×2560 Fwd GRU, LA Cony] with only a change in the loss function. 'LA Cony' refers to a look ahead convolution layer as seen in (Amodei et al., 2015), which works together with forward-only RNNs for deployment purpose.

The same as the Fisher-Switchboard dataset, the optimal stride is 4 for Gram-CTC and 2 for vanilla CTC on this dataset. Thus, in both experiments, both Gram-CTC and vanilla CTC+Gram-CTC were trained much faster than the vanilla CTC itself. The result are shown in Table 5.

TABLE 5

LVCSR results on 10K speech dataset.

| Architecture | WER (No LM) | WER (With LM) |
| --- | --- | --- |
| Vanilla CTC | 29.1 | 19.77 |
| Gram-CTC | 27.56 | 19.53 |
| Vanilla CTC + Gram-CTC | 25.59 | 18.52 |

As shown in Table 5, the Gram-CTC performs better than CTC. After joint-training with vanilla CTC, its performance is further boosted, which verifies joint-training helps training. In fact, with only a small cost of time, it effectively reduces the WER from 27.59% to 24.92% (without language model).

F. Some Conclusions

In this patent document, embodiments of a Gram-CTC loss to enable automatic decomposition of target sequences into learned grams were presented. Also presented were techniques to train a Gram-CTC in a clean and stable way.

Extensive experiments demonstrate the proposed Gram-CTC enables the models to run more efficiently than the vanilla CTC, by using larger stride, while obtaining better performance of sequence labelling. Comparison experiments on multiple-scale datasets show the proposed Gram-CTC obtains state-of-the-art results on various ASR tasks. It shall be noted that such systems and methods not only improve computing system performance by being more efficient and more effective but may also be employed in numerous sequence labelling tasks, which can aid human-computer interactions.

Also, in embodiments, an interesting observation is that the learning of Gram-CTC implicitly avoids the "degenerated solution" that occur in a traditional "unit discovery" task, without involving any Bayesian priors or the "minimum description length" constraint. Using a small gram set that contains only short (e.g., up to 5) as well as high frequency grams helps explain the success.

G. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 7:
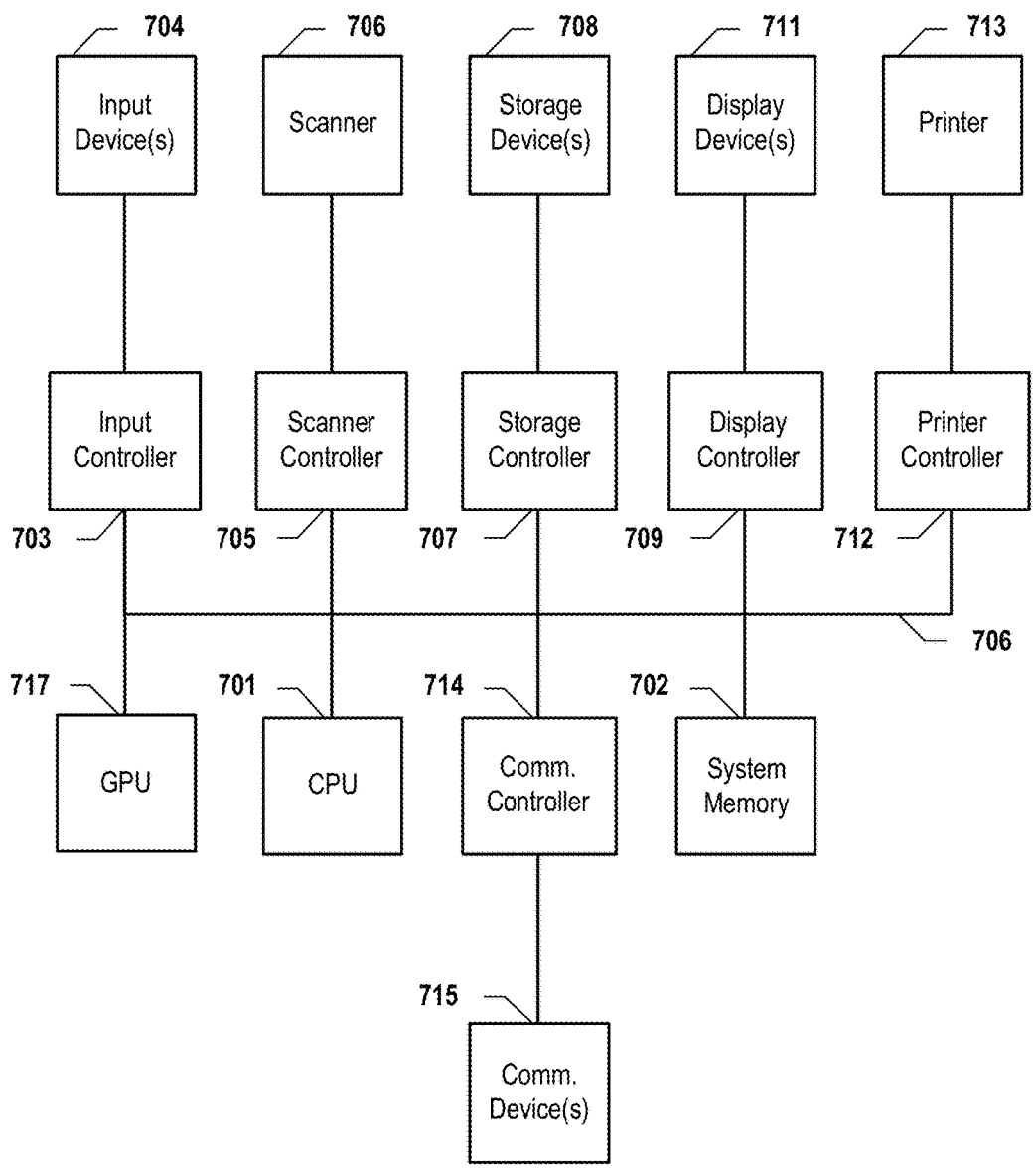
FIG. 7 depicts a simplified block diagram of a computing device/information handling system, in accordance with embodiments of the present document.

FIG. 7 depicts a simplified block diagram of a computing device/information handling system (or computing system) according to embodiments of the present disclosure. It will be understood that the functionalities shown for system 700 may operate to support various embodiments of an information handling system—although it shall be understood that an information handling system may be differently configured and include different components.

As illustrated in FIG. 7, system 700 includes one or more central processing units (CPU) 701 that provides computing resources and controls the computer. CPU 701 may be implemented with a microprocessor or the like, and may also include one or more graphics processing units (GPU) 717 and/or a floating-point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. The computing system 700 may also include a printer controller 712 for communicating with a printer 713. A communications controller 714 may interface with one or more communication devices 715, which enables system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims may be arranged differently including having multiple dependencies, configurations, and combinations.

What is claimed is:

1. A computer-implemented method for training a transcription model for speech transcription, the method comprising:
    inputting a sequence of utterances into the transcription model, with the utterances and associated labels sampled from a training set;
    establishing a set of grams comprising uni-grams and high-order grams;
    employing striding to process the input sequence of utterances with stride size depending on the largest gram of the gram set;
    predicting, from the transcription model, one or more units for each utterance of the sequence of utterances, the one or more units selected from the established set of grams; and
    implementing a Gram Connectionist Temporal Classification (Gram-CTC) loss function to measure an error of the predicted one or more units for each utterance given the associated labels, the Gram-CTC loss function automatically selects useful grams and decomposes the input sequence with the selected grams, the Gram-CTC loss function implementation involving forward-backward transitions;
    computing a derivative of the loss with respect to parameters of the transcription model; and
    updating the transcription model using the derivative through back-propagation.

2. The computer-implemented method of claim 1 wherein the established set of grams comprises all uni-grams and bi-grams.

3. The computer-implemented method of claim 1 wherein the high-order grams are selected in a sample dataset with occurrence frequency above a threshold.

4. The computer-implemented method of claim 1 wherein predicted one or more units for each utterance comprises non-overlapping bigrams at word level.

5. The computer-implemented method of claim 1 wherein predicting one or more characters for each utterance comprises allowing decomposition of a word into large units with intuitive and meaningful high-order grams.

6. The computer-implemented method of claim 1 wherein predicting one or more characters for each utterance comprises allowing decomposition of a sentence into segments which are meaningful in term of pronunciation.

7. The computer-implemented method of claim 1 further comprising training the transcription model jointly with a vanilla CTC loss function.

8. The computer-implemented method of claim 1 wherein the utterances have linear Fast Fourier Transform (FFT) features normalized such that each input feature has zero mean and unit variance.

9. A computer-implemented method for training a recurrent neural network (RNN) model for speech transcription, the method comprising:
    inputting a plurality of utterance and associated labels to the RNN model, the utterances and associated labels being sampled from a training set, the RNN model comprising one or more convolutional layers and one or more recurrent layers;
    predicting one or more units among an established gram set through the one or more recurrent layers of the RNN model;
    obtaining a probability distribution over the predicted units in an output layer of the RNN model; and
    implementing a Gram Connectionist Temporal Classification (Gram-CTC) loss function to measure an error in prediction of a unit for the utterance given the associated label, the Gram-CTC loss function automatically selects useful grams and decomposes the input sequence with the selected grams;
    computing a derivative of the loss with respect to parameters of the RNN model; and
    updating the RNN model using the derivative through back-propagation.

10. The computer-implemented method of claim 9 wherein the one or more recurrent layers are forward or bidirectional Gated Recurrent layers.

11. The computer-implemented method of claim 9 wherein the output layer is a softmax layer.

12. The computer-implemented method of claim 9 wherein the one or more convolutional layers are two-dimensional convolutional layers.

13. The computer-implemented method of claim 9 wherein implementing the Gram-CTC loss function comprises forward and backward state transitions.

14. The computer-implemented method of claim 9 wherein the predicted one or more units are uni-grams or high-order grams.

15. The computer-implemented method of claim 9 wherein the established gram set comprises all uni-grams and selected high-order grams.

16. The computer-implemented method of claim 15 wherein the selected high-order grams are selected in a sample dataset with occurrence frequency above a threshold.

17. A non-transitory computer-readable medium or media comprising one or more sequences of instructions which, when executed by one or more microprocessors, causes the steps to be performed comprising:

receiving a plurality of utterance sequences, each utterance sequence and associated label being sampled from a training set;

outputting a probability distribution over predicted units corresponding to the utterance sequences to a Gram Connectionist Temporal Classification (Gram-CTC) loss function; the Gram-CTC loss function automatically selects useful grams among uni-grams and selected high-order grams to decomposes the utterance sequence with the selected grams; and implementing a Gram-CTC loss function algorithm to measure an error of the predicted one or more characters for each utterance given the associated labels, the Gram-CTC loss function implementation involving forward-backward transitions.

18. The non-transitory computer-readable medium or media of claim 17 wherein the selected high-order grams are bi-grams.

19. The non-transitory computer-readable medium or media of claim 18 wherein the bi-grams selected in a sample dataset with occurrence frequency above a threshold.

20. The non-transitory computer-readable medium or media of claim 17 further comprising computing a derivative of the loss with respect to the predicted units and implementing back-propagation using the derivative.

* * * * *